United States Patent [19]

Duckwall

[11] Patent Number: 5,522,600
[45] Date of Patent: Jun. 4, 1996

[54] ANNULAR LUBRICANT SEAL ASSEMBLY WITH SPRING MEMBER

[75] Inventor: Brian N. Duckwall, Oklahoma City, Okla.

[73] Assignee: Dana Corporation, Toledo, Ohio

[21] Appl. No.: 407,811

[22] Filed: Mar. 21, 1995

Related U.S. Application Data

[63] Continuation-in-part of Ser. No. 939,132, Sep. 2, 1992, Pat. No. 5,398,942.

[51] Int. Cl.$^6$ ........................................................ F16J 15/32
[52] U.S. Cl. ................................. 277/38; 277/50; 277/153
[58] Field of Search ............................ 277/35, 38, 47–50, 277/51, 152, 153

[56] References Cited

U.S. PATENT DOCUMENTS

| | | |
|---|---|---|
| Re. 30,223 | 3/1980 | Prescott et al. . |
| 2,061,153 | 11/1936 | Heinze ........................................ 277/50 |
| 2,362,843 | 11/1944 | Northup ...................................... 277/48 |
| 2,695,801 | 11/1954 | Kosatka . |
| 3,341,265 | 9/1967 | Paterson . |
| 3,356,376 | 12/1967 | Bradfute et al. . |
| 3,510,138 | 5/1970 | Bowen et al. . |
| 3,614,183 | 10/1971 | Berens et al. . |
| 3,682,488 | 8/1972 | Matsushima . |
| 3,746,351 | 7/1973 | Tucker, Jr. . |
| 3,771,799 | 11/1973 | Sekulich et al. ............................ 277/47 |
| 4,037,848 | 7/1977 | Prescott et al. . |
| 4,037,849 | 7/1977 | Thumm . |
| 4,083,567 | 4/1978 | Thumm . |
| 4,208,057 | 6/1980 | Messenger . |
| 4,243,232 | 1/1981 | Repella . |
| 4,252,329 | 2/1981 | Messenger . |
| 4,274,641 | 6/1981 | Cather, Jr. . |
| 4,283,063 | 8/1981 | Prescott . |
| 4,285,526 | 8/1981 | Klinteberg et al. . |
| 4,426,094 | 1/1984 | Antonini . |
| 4,428,630 | 1/1984 | Folger et al. . |
| 4,432,557 | 2/1984 | Drucktenhengst . |
| 4,448,426 | 5/1984 | Jackowski et al. . |
| 4,508,020 | 4/1985 | Szcupak . |
| 4,527,673 | 7/1985 | Szcupak . |
| 4,531,748 | 7/1985 | Jackowski . |
| 4,550,920 | 11/1985 | Matsushima . |
| 4,553,763 | 11/1985 | Ehrmann . |
| 4,575,104 | 3/1986 | Nagasawa et al. . |
| 4,588,195 | 5/1986 | Antonini et al. . |
| 4,696,479 | 9/1987 | Karcher . |
| 4,721,312 | 1/1988 | Hornberger . |
| 4,844,484 | 7/1989 | Antonini et al. . |
| 4,856,794 | 8/1989 | Boyers et al. . |
| 4,981,303 | 1/1991 | Matsushima et al. . |
| 5,004,248 | 4/1991 | Messenger et al. . |
| 5,015,001 | 5/1991 | Jay . |
| 5,024,449 | 6/1991 | Otto . |
| 5,398,942 | 3/1995 | Duckwall et al. ........................ 277/50 |

OTHER PUBLICATIONS

CR Seals Handbook; Catalog 457010; Jan. 1986; pp. 30–33.

*Primary Examiner*—Scott W. Cummings
*Attorney, Agent, or Firm*—MacMillan, Sobanski & Todd

[57] ABSTRACT

An annular lubricant seal assembly for providing a seal between a shaft extending through a bore formed in a housing and the housing, wherein the shaft and the housing are rotatable relative to one another. The seal assembly includes an annular outer case, which is press fit into the bore, an annular inner case, and a spring member, the inner case being mounted on the shaft. Portions of the outer case extend adjacent to, but are spaced apart from portions of the inner case. An elastomeric seal member is secured to the outer case. Flexible lips formed on the seal member engage both axially and radially extending portions of the inner case disposed adjacent to the outer case. As a result, the seal member is capable of providing a secure seal against the shaft, even when the shaft moves axially or radially relative to the housing during use. In an alternative embodiment, a leg portion of the outer case extends axially along the entire length of the seal assembly to protect the other components during installation. Also, a terminal end portion of the resilient layer extends between adjacent legs of the inner case and the outer case to provide a resilient cushion therebetween as the inner case moves axially relative to the outer cause, preventing undesirable contact therebetween.

19 Claims, 2 Drawing Sheets

5,522,600

ANNULAR LUBRICANT SEAL ASSEMBLY WITH SPRING MEMBER

CROSS REFERENCE TO RELATED APPLICATION

This application is a continuation-in-part of Ser. No. 07/939,132, filed Sep. 2, 1992, now U.S. Pat. No. 5,398,942.

BACKGROUND OF THE INVENTION

This invention relates in general to lubricant seals and in particular to an improved structure for an annular lubricant seal assembly for providing a seal between a shaft extending through a bore formed in a housing and the housing, wherein the shaft and the housing are rotatable relative to one another.

Annular lubricant seal assemblies are typically used in vehicle axle assemblies for providing a seal between a non-rotating axle spindle or shaft and a rotatable wheel hub or housing disposed about the shaft. Lubricant seal assemblies of this type are provided to both to retain lubricant within the wheel hub and to prevent dirt and other contaminants from entering therein. Known lubricant seal assemblies typically include an annular metallic outer case which is press fit within a bore formed in the wheel hub. An annular inner case is mounted concentrically within the outer case. The axle spindle extends through the inner case, which is free to rotate therewith relative to the outer case. A sealing element formed of a resilent material is typically disposed between the outer case and the inner case. This sealing element includes one or more flexible lips which prevent the escape of lubricant from the housing. The sealing element may also include a supplemental flexible lip to prevent contaminants from entering within the wheel hub.

During operation of the vehicle, the wheel hub not only rotates relative to the axle spindle, but also frequently moves both axially and radially relative thereto. Such axial and radial movement can undesirably distort the shape of the sealing element, resulting in a loss of the seal formed by the flexible lips. Also, repetitious axial and radial movements over a period of time can damage the flexible lips. As a result, lubricant may escape from the wheel hub, and dirt and other contaminants may enter therein. Thus, it would be desirable to provide an improved structure for an annular lubricant seal assembly which can accommodate such relative axial and radial movements, while providing a reliable seal between relatively rotatable components.

SUMMARY OF THE INVENTION

This invention relates to an improved structure for an annular lubricant seal assembly for providing a seal between a shaft extending through a bore formed in a housing and the housing, wherein the shaft and the housing are rotatable relative to one another. The seal assembly includes an annular outer case, which is press fit into the bore, and an annular inner case, which is mounted on the shaft. Portions of the outer case extend adjacent to, but are spaced apart from portions of the inner case. An elastomeric seal member is secured to the outer case. Flexible lips formed on the seal member engage both axially and radially extending portions of the inner case disposed adjacent to the outer case. As a result, the seal member is capable of providing a secure seal against the shaft, even when the shaft moves axially or radially relative to the housing during use. In an alternative embodiment, a leg portion of the outer case extends axially along the entire length of the seal assembly to protect the other components during installation. Also, a terminal end portion of the resilient layer extends between adjacent legs of the inner case and the outer case to provide a resilient cushion therebetween as the inner case moves axially relative to the outer cause, preventing undesirable contact therebetween.

Various objects and advantages of this invention will become apparent to those skilled in the art from the following detailed description of the preferred embodiments, when read in light of the accompanying drawing.

DETAILED DESCRIPTION OF THE PREFERRED EMBODIMENTS

Figure 1:
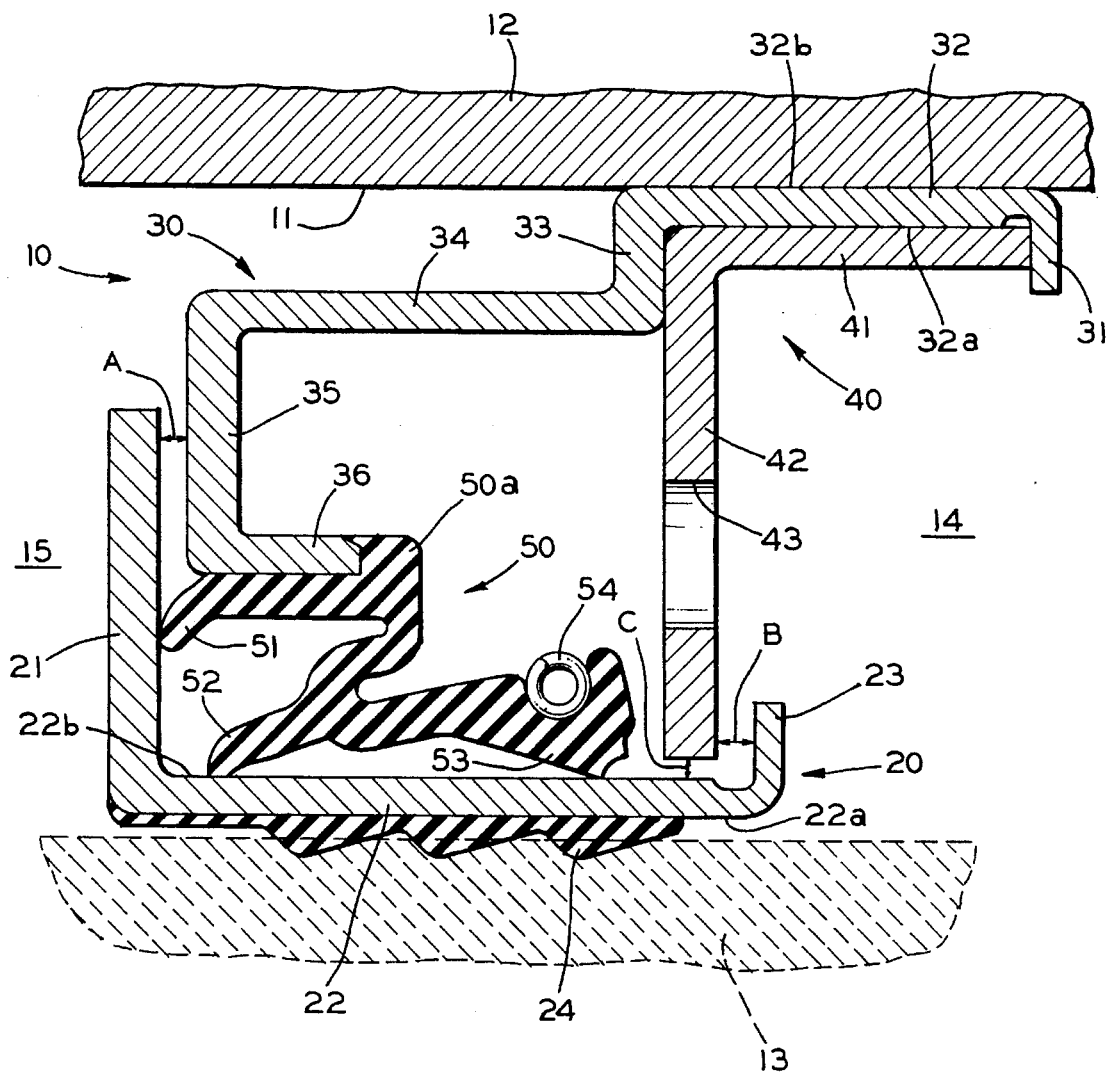
FIG. 1 is a sectional elevational view of a portion of a first embodiment of an annular lubricant seal assembly in accordance with this invention.

Referring now to the drawings, there is illustrated in FIG. 1 a portion of a first embodiment of an annular lubricant seal assembly, indicated generally at 10, in accordance with this invention. The seal assembly 10 is disposed within a bore 11 formed through a housing 12. The housing 12 may, for example, be a rotatable wheel hub for a vehicle. A shaft, indicated in dotted lines at 13, extends through the seal assembly 10. The shaft 13 may, for example, be an axle spindle for a vehicle which rotatably supports the wheel hub 12 thereon. Typically, the housing 12 also moves axially and radially relative to the shaft 13 during operation, although by relatively small amounts. As will be explained in detail below, the seal assembly 10 functions to retain lubricant within the housing 12, while permitting relative rotational, axial, and radial movement of the housing 12 relative to the shaft 13. In the illustrated embodiment, the space 14 indicates the lubricant side of the seal assembly 10, while the space 15 indicates the external environment.

The seal assembly 10 includes an annular metallic inner case, indicated generally at 20. The inner case 20 is generally U-shaped in cross section, having a first radially extending leg portion 21, a second leg portion 22 extending axially from the innermost end of the first leg portion 21, and a third leg portion 23 extending radially outwardly from the end of the second leg portion 22 opposite the first leg portion 21. The second portion 22 has an inner circumferential surface 22a and an outer circumferential surface 22b. The inner circumferential surface 22a has a layer 24 of resilient material, such as nitrile rubber, adhered thereto by conventional means.

The resilient layer 24 may be formed having a convoluted inner surface which, in the illustrated embodiment, may be generally ramp-shaped in cross section. Portions of the convoluted inner surface define an inner diameter which is smaller than the outer diameter of the shaft 13. Thus, those portions of the resilient layer 24 are compressed when the shaft 13 is inserted through the inner case 20. As a result, the inner case 20 is secured to the shaft 13 during operation. The convoluted portions of the resilient layer 24 are formed having the ramp-like configuration to facilitate installation of the inner case 20 onto the shaft 13 in one axial direction, yet resist removal thereof in the opposite axial direction.

The seal assembly 10 also includes an annular metallic outer case, indicated generally at 30. As shown in FIG. 1, the outer case 30 has a convoluted cross sectional shape defined by six leg portions. A first leg portion 31 of the outer case 30 extends radially. A second leg portion 32 of the outer case 30 extends axially from the outermost end of the first leg portion 31. The second leg portion 32 has an inner circumferential surface 32a and an outer circumferential surface 32b. The outer circumferential surface 32b of the second leg portion 32 is press fit into the bore 11 of the housing 12. Thus, unlike the inner case 20 which is mounted on the shaft 13, the outer case 30 is mounted on the housing 12 during operation.

A third leg portion 33 of the outer case 30 extends radially outwardly from the end of the second leg portion 32 opposite the first leg portion 31. Thus, the first leg portion 31 and the third leg portion 33 of the outer case 30 define an axially extending space therebetween, the purpose of which will be explained below. A fourth leg portion 34 extends axially from the innermost end of the third leg portion 33. A fifth leg portion 35 extends radially inwardly from the end of the fourth leg portion 34 opposite the third leg portion 33. Finally, a sixth leg portion 36 extends axially from the innermost end of the fifth leg portion 35.

As shown in FIG. 1, the outer case 30 is disposed generally concentrically about the inner case 20. A portion of the fifth leg portion 35 of the outer case 30 extends adjacent to, but is spaced apart from, the first leg portion 21 of the inner case 20. These adjacent portions of the inner case 20 and the outer case 30 define an axially extending space therebetween, which is identified as "A" in FIG. 1. The purpose of this axially extending space "A" will be explained below.

The seal assembly 10 further includes an annular metallic shield, indicated generally at 40. The shield 40 has an inverted-L cross sectional shape, having an axially extending leg portion 41 and a radially extending leg portion 42. The axially extending leg portion 41 is disposed adjacent to the second leg portion 32 of the outer case 30, while a portion of the radially extending leg portion 42 is disposed adjacent to the third leg portion 33. In practice, the first leg portion 31 of the outer case 30 is initially formed parallel with the second leg portion 32. The axially and radially extending portions 41 and 42 of the shield 40 are disposed adjacent to the second and third leg portions 32 and 33, respectively. Then, the first leg portion 31 of the outer case 30 is rolled radially inwardly as shown in FIG. 1. As a result, the shield 40 is securely engaged to the outer case 30. One or more apertures 43 are formed through the radially extending leg portion 42 of the shield 40. The purpose of these apertures 43 will be explained below.

Thus, it can be seen that the shield 40 is supported concentrically within the outer case 30. As shown in FIG. 1, a portion of the radially extending leg portion 42 of the shield 40 extends adjacent to, but is spaced apart from, the third leg portion 23 of the inner case 20. These adjacent portions of the inner case 20 and the shield 40 define an axially extending space therebetween, which is identified as "B" in FIG. 1. The purpose of this axially extending space "B" will be explained below. Also, the innermost end of the radially extending leg portion 42 is disposed adjacent to, but is spaced apart from, the inner circumferential surface 22b of the second leg portion 22 of the inner case 20. These adjacent portions of the inner case 20 and the shield 40 define a radially extending space therebetween, which is identified as "C" in FIG. 1. The purpose of this radially extending space "C" will be explained below.

Lastly, the seal assembly 10 includes an annular seal member, indicated generally at 50. The seal member 50 is formed from a resilient elastomeric material, such as nitrile rubber. The seal member 50 has a base portion 50a which is bonded to the sixth leg portion 36 of the outer case 30. A first flexible lip 51 extends generally axially from the base portion 50a into sealing engagement with the first leg portion 21 of the inner case 20 second flexible lip 52 extends generally radially from the base portion 50a into sealing engagement with the second leg portion 22 of the inner case 20, adjacent to the first leg portion 21. A third flexible lip 53 also extends generally radially from the base portion 50a into sealing engagement with the second leg portion 22 of the inner case 20, but adjacent to the third leg portion 23. A conventional garter spring 54 extends about the inner portion of the third flexible lip 53, urging it into sealing engagement with the second leg portion 22 of the inner case 20.

In operation, the seal assembly 10 is installed in the housing by press fitting the outer case 30 into the bore 11. Then, the housing 12 and the seal assembly 10 are installed on the shaft 13 such that the shaft 13 extends through the inner case 20. During normal operation, the housing 12 and the shaft 13 rotate generally concentrically relative to one another and, therefore, relative to the seal assembly 10. However, as mentioned above, the housing 12 may also move both axially and radially relative to the shaft 13. Thus, the outer case 30, the shield 40, and the seal member 50 not only rotates relative to the inner case 20, but also move axially and radially relative thereto. The clearances "A" "B" and "C" discussed above are provided to accommodate such relative movement of the inner case 20. The clearance "A" also restricts the entry of dirt and other contaminants into the interior of the seal assembly 10, thus protecting the seal member 50 therefrom.

Throughout such relative axial and radial movements of the housing 12 and the shaft 13, the flexible lips 51, 52, and 53 of the seal member 50 engage the leg portions 21 and 22 of the inner case 20 to provide a seal therebetween. As discussed above, the first flexible lip 51 resiliently engages the first radially extending leg portion 21 of the inner case 20. The first flexible lip 51 functions as the primary seal to prevent dirt and other contaminants from entering within the seal assembly 10. Because of its flexibility, the first flexible lip 51 maintains contact with the first leg portion 21 of the inner case 20 when the shaft 13 and the inner case 20 move axially relative to the housing 12 and the outer case 30.

As also discussed above, the second and third flexible lips 52 and 53 resiliently engage axially extending second leg portion 22 of the inner case. The second flexible lip 52 functions as a secondary seal, also to prevent dirt and other contaminants from entering within the seal assembly 10. The third flexible lip 53 functions as the oil seal, preventing lubricant from draining from the interior space 14 to the exterior space 15. Because of their flexibility, the second and third flexible lips 52 and 53 maintain contact with the second leg portion 22 of the inner case 20 when the shaft 13 and the inner case 20 move radially relative to the housing 12 and the outer case 30.

As discussed above, clearances "A" "B" and "C" are provided between portions of the inner case 20, the outer case 30, and the shield 40. These clearances are designed to accommodate the axial and radial movement of the housing 12 (and the outer case 30 and the shield 40 mounted thereon) relative to the shaft 13 (and the inner case 20 mounted thereon). The apertures 43 are provided to permit lubricant to flow freely from the interior space 14 to the inside area of the seal assembly 10. This prevents any suction or vacuum effect from occurring in the seal assembly 10 as a result of continuous reciprocating movement of the inner case 20 relative to the outer case 30 and the shield 40.

Figure 2:
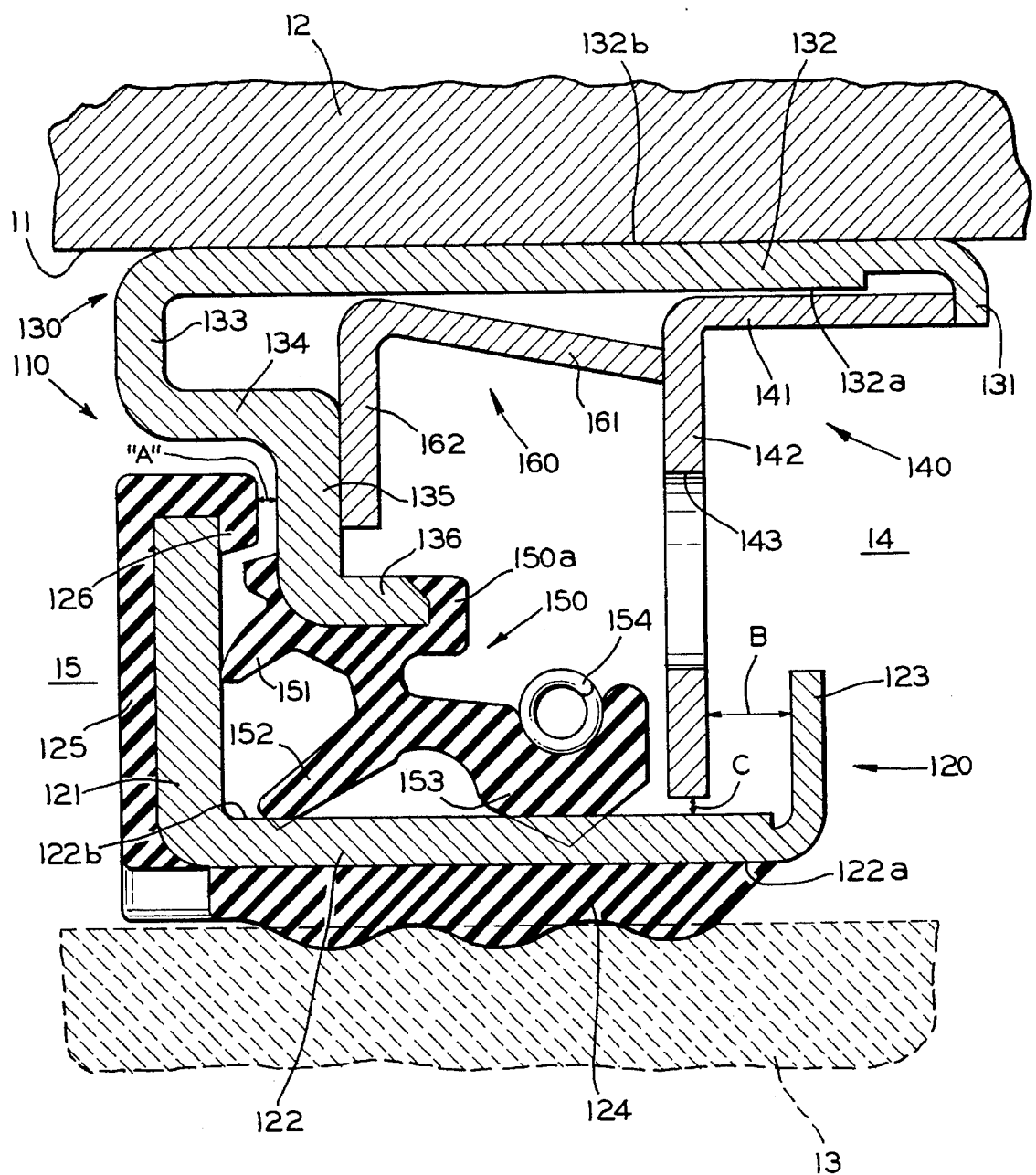
FIG. 2 is a sectional elevational view of a portion of a second embodiment of an annular lubricant seal assembly in accordance with this invention.

Referring now to FIG. 2, there is illustrated a portion of a second embodiment of an annular lubricant seal assembly, indicated generally at 110, in accordance with this invention. The seal assembly 110 is disposed within a bore 11 formed through a housing 12. The housing 12 may, for example, be a rotatable wheel hub for a vehicle. A shaft, indicated in dotted lines at 13, extends through the seal assembly 110. The shaft 13 may, for example, be an axle spindle for a vehicle which rotatably supports the wheel hub 12 thereon. Typically, the housing 12 also moves axially and radially relative to the shaft 13 during operation, although by relatively small amounts. As will be explained in detail below, the seal assembly 110 functions to retain lubricant within the housing 12, while permitting relative rotational, axial, and radial movement of the housing 12 relative to the shaft 13. In the illustrated embodiment, the space 14 indicates the lubricant side of the seal assembly 110, while the space 15 indicates the external environment.

The seal assembly 110 includes an annular metallic inner case, indicated generally at 120. The inner case 120 is generally U-shaped in cross section, having a first radially extending leg portion 121, a second leg portion 122 extending axially from the innermost end of the first leg portion 21, and a third leg portion 123 extending radially outwardly from the end of the second leg portion 122 opposite the first leg portion 121. The second portion 122 has an inner circumferential surface 122a and an outer circumferential surface 122b.

The inner circumferential surface 122a has an axially extending layer 124 of resilient material, such as nitrile rubber, adhered thereto by conventional means. The axially extending resilient layer 124 may be formed having a convoluted inner surface which, as in the embodiment illustrated in FIG. 1, may be generally ramp-shaped in cross section. Alternatively, as shown in FIG. 2, the convoluted inner surface of the resilient layer 124 may be generally sinusoidal in shape. Portions of the convoluted inner surface define an inner diameter which is smaller than the outer diameter of the shaft 13. Thus, those portions of the resilient layer 124 are compressed when the shaft 13 is inserted through the inner case 120. As a result, the inner case 120 is secured to the shaft 13 during operation.

A radially extending layer 125 of resilient material is formed integrally with the axially extending layer 124. The radially extending layer 125 is adhered to the first leg portion 121 of the inner case 120. The layer 125 extends radially outwardly along the outer radial surface of the first leg portion 121, axially over the end thereof, then terminates in a radially inwardly extending portion 126 which extends a short distance along the inner radial surface of the first leg portion 121. The purpose of this radially extending layer 125 and terminal end portion 126 will be explained below.

The seal assembly 110 also includes an annular metallic outer case, indicated generally at 130. As shown in FIG. 2, the outer case 130 has a convoluted cross sectional shape defined by six leg portions. A first leg portion 131 of the outer case 30 extends radially. A second leg portion 132 of the outer case 130 extends axially from the outermost end of the first leg portion 131. The second leg portion 132 of the outer case 130 extends axially along the entire length of the seal assembly 110, for a purpose which will be explained below. The second leg portion 132 has an inner circumferential surface 132a and an outer circumferential surface 132b. The outer circumferential surface 132b of the second leg portion 132 is press fit into the bore 11 of the housing 12. Thus, unlike the inner case 120 which is mounted on the shaft 13, the outer case 130 is mounted on the housing 12 during operation.

A third leg portion 133 of the outer case 130 extends radially outwardly from the end of the second leg portion 132 opposite the first leg portion 131. Thus, the first leg portion 131 and the third leg portion 133 of the outer case 130 define an axially extending space therebetween, the purpose of which will be explained below. A fourth leg portion 134 extends axially from the innermost end of the third leg portion 133 toward the first leg portion 131. A fifth leg portion 135 extends radially inwardly from the end of the fourth leg portion 134 opposite the third leg portion 133. Finally, a sixth leg portion 136 extends axially from the innermost end of the fifth leg portion 135, again toward the first leg portion 131.

As shown in FIG. 2, the outer case 130 is disposed generally concentrically about the inner case 120. A portion of the fifth leg portion 135 of the outer case 130 extends adjacent to, but is spaced apart from, the first leg portion 121 of the inner case 120 and the terminal end portion 126 of the resilient layer 125. These adjacent portions of the inner case 120 and the terminal end portion 126 of the resilient layer 125 define an axially extending space therebetween, which is identified as "A" in FIG. 2. The purpose of this axially extending space "A" is the same as described above with respect to the FIG. 1 embodiment.

The seal assembly 110 further includes an annular metallic shield, indicated generally at 140. The shield 140 has an inverted-L cross sectional shape, having an axially extending leg portion 141 and a radially extending leg portion 142. The axially extending leg portion 141 is disposed adjacent to the second leg portion 132 of the outer case 130. One or more apertures 143 (only one is illustrated) are formed through the radially extending leg portion 142 of the shield 140. The purpose of these apertures 143 will be explained below. The shield 140 is supported concentrically within the outer case 130 in a manner described below. As shown in FIG. 2, a portion of the radially extending leg portion 142 of the shield 140 extends adjacent to, but is spaced apart from, the third leg portion 123 of the inner case 120. These adjacent portions of the inner case 120 and the shield 140 define an axially extending space therebetween, which is identified as "B" in FIG. 2. The purpose of this axially extending space "B" is the same as described above with respect to the FIG. 1 embodiment. Also, the innermost end of the radially extending leg portion 142 is disposed adjacent to, but is spaced apart from, the inner circumferential surface 122b of the second leg portion 122 of the inner case 120. These adjacent portions of the inner case 120 and the shield 140 define a radially extending space therebetween, which is identified as "C" in FIG. 2. The purpose of this radially extending space "C" is the same as described above with respect to the FIG. 1 embodiment.

The seal assembly 110 also includes an annular seal member, indicated generally at 150. The seal member 150 is formed from a resilient elastomeric material, such as nitrile rubber. The seal member 150 has a base portion 150a which is bonded to the sixth leg portion 136 of the outer case 130. A first flexible lip 151 extends generally axially from the base portion 150a into sealing engagement with the first leg portion 121 of the inner case 120. A second flexible lip 152 extends generally radially from the base portion 150a into sealing engagement with the second leg portion 122 of the inner case 120, adjacent to the first leg portion 121. A third flexible lip 153 also extends generally radially from the base portion 150*a* into sealing engagement with the second leg portion 122 of the inner case 120, but adjacent to the third leg portion 123. A conventional garter spring 154 extends about the inner portion of the third flexible lip 153, urging it into sealing engagement with the second leg portion 122 of the inner case 120.

Lastly, a spring member, indicated generally at 160, is provided for supporting the shield 140 concentrically within the outer case 130. The spring member 160 is generally V-shaped in cross section, including a first leg 161 which extends generally axially and a second leg portion 162 which extends generally radially. The first leg portion 161 of the spring member 160 extends generally adjacent to the adjacent to the second leg portion 132 of the outer case 130. The end of the first leg portion 161 of the spring member 160 abuts the radially extending leg portion 142 of the shield 140. A portion of the second leg portion 162 of the spring member 160 abuts the fifth leg portion 135 of the outer case 130. The spring member 160 is formed from a flexible metallic material.

To assemble the seal assembly 110, the first leg portion 131 of the outer case 130 is initially formed parallel with the second leg portion 132. The spring member 160 is then disposed within the outer case 130 such that the radially extending leg portion 162 abuts the fifth leg portion 135 of the outer case 130. The shield 140 is next disposed within the outer case 130 such that the radially extending leg portion 142 abuts the end of the axially extending leg portion 161 of the spring member 160 and the axially extending portion 141 is disposed adjacent to the second leg portion 132 of the outer case 130. Then, the first leg portion 131 of the outer case 130 is rolled radially inwardly as shown in FIG. 2. As a result, the shield 140 compresses the spring member 160. Consequently, the shield 140 is securely retained engaged to the outer case 130 between the first leg portion 131 thereof and the spring member 160.

The basic operation of the seal assembly 110 is substantially the same as the seal assembly 10 described above. The seal assembly 110 is installed by pressing the outer case 130 into the bore 11 formed through the housing 12 from left to right when viewing FIG. 2. Although it is not recommended, such installation is often performed by applying sharp blows to the seal assembly 110, such as by a hammer. In the embodiment illustrated in FIG. 2, the second leg portion 132 of the outer case 130 extends axially along the entire length of the seal assembly 110. Thus, if this undesirable method of installation is performed, the sharps blows will be applied to the third leg portion 133 of the outer case 130, thus providing a measure of protection for the other components of the seal assembly 110. Also, the terminal end portion 126 of the resilient layer 125 is disposed between the first leg portion 121 of the inner case 120 and the fifth leg portion 135 of the outer case 130. During use, the inner case 120 not only rotates relative to the outer case 130, but may also move axially relative thereto. The terminal end portion 126 provides a resilient cushion between the first leg portion 121 of the inner case 120 and the fifth leg portion 135 of the outer case 130 in the event that the inner case 120 moves such a distance axially as to otherwise cause undesirable contact therebetween.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A seal assembly for providing a seal between a shaft extending through a bore formed in a housing and the housing, the seal assembly comprising:

an inner case adapted to be mounted on the shaft, said inner case including an axially extending leg portion and a radially extending leg portion;

an outer case adapted to be mounted on the housing within the bore and about said inner case, said outer case including first and second radially extending leg portions;

a spring member disposed within said outer case and having a first leg portion and a second leg portion, said first leg portion abutting said first radially extending leg of said outer case;

a shield disposed within said outer case and including an axially extending leg portion and a radially extending leg portion said shield being engaged between said second leg portion of said spring member and said second radially extending leg portion of said outer case; and a resilient seal member attached to said outer case and engaging a portion of said inner case to provide a seal between the shaft and the housing.

2. The seal assembly defined in claim 1 wherein said spring member is generally V-shaped in cross section.

3. The seal assembly defined in claim 1 wherein the second leg portion of said spring member extends generally axially and terminates in an end which abuts said radially extending leg portion of said shield.

4. The seal assembly defined in claim 3 wherein the first leg portion of said spring member extends generally radially.

5. The seal assembly defined in claim 1 wherein a portion of said radially extending leg portion of said inner case extends adjacent to, but is spaced apart from, a portion of said outer case.

6. The seal assembly defined in claim 1 wherein a layer of resilient material is adhered to said radially extending leg portion of said inner case, and wherein a portion of said resilient material extends adjacent to, but is spaced apart from, a portion of said outer case.

7. The seal assembly defined in claim 1 wherein said inner case further includes a second radially extending leg portion, a portion of said second radially extending leg portion of said inner case extending adjacent to, but spaced apart from, a portion of said radially extending leg portion of said shield.

8. The seal assembly defined in claim 1 wherein said shield includes an aperture formed through said radially extending leg portion.

9. The seal assembly defined in claim 8 wherein said shield includes a plurality of apertures formed through said radially extending leg portion.

10. The seal assembly defined in claim 1 wherein said radially extending leg portion of said shield terminates adjacent to, but spaced apart from, said axially extending leg of said inner case.

11. The seal assembly defined in claim 1 wherein said inner case has a layer of resilient material adhered to an inner circumferential surface of said axially extending leg portion, said layer adapted to mount said inner case on said shaft.

12. The seal assembly defined in claim 1 wherein said seal member includes a first flexible lip which resiliently engages said radially extending leg of said inner case.

13. The seal assembly defined in claim 12 wherein said seal member further includes a second flexible lip which resiliently engages said axially extending leg of said inner case.

14. The seal assembly defined in claim 13 wherein said seal member further includes a third flexible lip which also resiliently engages said axially extending leg of said inner case.

15. The seal assembly defined in claim 14 wherein said seal member further includes a garter spring disposed about said third flexible lip for urging it to resiliently engage said axially extending leg of said inner case.

16. A seal assembly for providing a seal between a shaft extending through a bore formed in a housing and the housing, the seal assembly comprising:

an inner case adapted to be mounted on the shaft, said inner case including an axially extending leg portion and a radially extending leg portion;

an outer case adapted to be mounted on the housing within the bore and about said inner case, said outer case including first and second radially extending leg portions;

a spring member disposed within said outer case and having a first leg portion and a second leg portion, said first leg portion abutting said first radially extending leg of said outer case;

a shield disposed within said outer case and including an axially extending leg portion and a radially extending leg portion, said shield being engaged between said second leg portion of said spring member and said second radially extending leg portion of said outer case; and a resilient seal member attached to said outer case at a first radial location relative to said inner case and disposed between said radially extending leg portion of said inner case and said radially extending leg portion of said shield, said seal member engaging both said axially extending leg portion of said inner case and said radially extending leg portion of said inner case at second and third radial locations, respectively, relative to said inner case to provide a seal between the shaft and the housing, said first radial location being radially outward from both said second and third radial locations.

17. The seal assembly defined in claim 16 wherein said spring member is generally V-shaped in cross section.

18. The seal assembly defined in claim 16 wherein said spring member includes a leg portion which extends generally axially and terminates in an end which abuts said radially extending leg portion of said shield.

19. The seal assembly defined in claim 18 wherein said leg portion is a first leg portion, and wherein said spring member further includes a second leg portion which extends generally radially.

* * * * *

UNITED STATES PATENT AND TRADEMARK OFFICE
CERTIFICATE OF CORRECTION

PATENT NO. : 5,522,600
DATED : June 4, 1996
INVENTOR(S) : Brian N. Duckwall

It is certified that error appears in the above-indentified patent and that said Letters Patent is hereby corrected as shown below:

Column 8, Claim 1, Line 17,    after "portion", insert -- , --.

Column 10, Claim 18, Line 1,    after "wherein", insert -- the second leg portion --.

Column 10, Claim 18, Line 2,    delete "includes a leg portion which".

Column 10, Claim 19, Lines 1 and 2,    change "said leg portion is a first leg portion, and wherein", to -- the first leg portion of --.

Column 10, Claim 19, Line 3,    delete "further includes a second leg portion which".

Signed and Sealed this

Tenth Day of September, 1996

Attest:

BRUCE LEHMAN

*Attesting Officer*    *Commissioner of Patents and Trademarks*